United States Patent
Park et al.

(10) Patent No.: US 6,950,164 B2
(45) Date of Patent: Sep. 27, 2005

(54) ARRAY SUBSTRATE FOR IPS MODE LIQUID CRYSTAL DISPLAY DEVICE AND METHOD FOR FABRICATING THE SAME

(75) Inventors: Jeong-Ki Park, Gyeongsangbuk-do (KR); Jae-Sung Cho, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 261 days.

(21) Appl. No.: 10/020,894

(22) Filed: Dec. 19, 2001

(65) Prior Publication Data

US 2002/0167633 A1 Nov. 14, 2002

(30) Foreign Application Priority Data

Dec. 20, 2000 (KR) .................................. 10-2000-79356

(51) Int. Cl.⁷ .............................................. G02F 1/1343
(52) U.S. Cl. ...................... 349/141; 349/139; 349/140; 349/142; 349/143; 430/30; 430/22
(58) Field of Search ........................... 349/141, 37, 43, 349/143, 139, 140, 142, 42, 46, 187, 144, 40; 430/30, 149, 150, 151, 152, 183, 22

(56) References Cited

U.S. PATENT DOCUMENTS

| | | | | |
|---|---|---|---|---|
| 4,630,355 A | * | 12/1986 | Johnson ........................ | 29/575 |
| 5,530,568 A | * | 6/1996 | Yamamoto et al. ............ | 359/54 |
| 5,598,285 A | | 1/1997 | Kondo et al. .................. | 349/39 |
| 5,760,854 A | * | 6/1998 | Ono et al. ...................... | 349/38 |
| 5,838,037 A | | 11/1998 | Masutani et al. ............ | 257/296 |
| 5,914,762 A | | 6/1999 | Lee et al. | |
| 5,946,060 A | | 8/1999 | Nishiki et al. ................. | 349/48 |
| 5,990,987 A | | 11/1999 | Tanaka ......................... | 349/43 |
| 6,028,653 A | | 2/2000 | Nishida ....................... | 349/141 |
| 6,061,105 A | * | 5/2000 | Nakagawa .................... | 349/40 |
| 6,097,454 A | | 8/2000 | Zhang et al. .................. | 349/43 |
| 6,111,619 A | * | 8/2000 | He et al. ....................... | 349/43 |
| 6,146,796 A | * | 11/2000 | Kim ............................. | 430/30 |
| 6,226,057 B1 | * | 5/2001 | Lee .............................. | 349/38 |
| 6,239,854 B1 | * | 5/2001 | Hirakata et al. ............ | 349/149 |
| 6,281,958 B1 | * | 8/2001 | Nakajima .................... | 349/141 |
| 6,469,764 B1 | * | 10/2002 | Kim et al. .................... | 349/141 |
| 6,515,646 B2 | * | 2/2003 | Tokonomi et al. ............ | 345/96 |
| 6,587,162 B1 | * | 7/2003 | Kaneko et al. ............... | 349/43 |
| 2001/0013915 A1 | * | 8/2001 | Song ........................... | 349/141 |
| 2002/0101547 A1 | * | 8/2002 | Lee et al. ..................... | 349/40 |
| 2004/0057003 A1 | * | 3/2004 | Yoo et al. .................... | 349/141 |

FOREIGN PATENT DOCUMENTS

| | | |
|---|---|---|
| JP | 09-005764 | 1/1997 |
| JP | 09-073101 | 3/1997 |
| JP | 09-101538 | 4/1997 |
| JP | 09-105908 | 4/1997 |
| JP | 09-211495 | 8/1997 |
| JP | 11-125836 | 5/1999 |

OTHER PUBLICATIONS

R. Kieler et al.; "In–Plane Switching of Nematic Liquid Crystals"; Japan Display '92; pp. 547–550.
M. Oh–e, et al.; "Principles and Characteristics of Electro–Optical Behaviour with In–Plane Switching Mode"; Asia Display '95: pp. 577–580.

(Continued)

*Primary Examiner*—Nathan J. Flynn
*Assistant Examiner*—Fazli Erdem
(74) *Attorney, Agent, or Firm*—McKenna Long & Aldridge LLP

(57) ABSTRACT

An array substrate of in-plane switching (IPS) mode liquid crystal display device includes auxiliary patterns extended from a first conductive line under the common line in order to prevent a short caused by residues of metallic material that is used for forming a data line and the pixel electrode.

25 Claims, 4 Drawing Sheets

OTHER PUBLICATIONS

M. Ohta et al.; "Development of Super–TFT–LCDs with In–Plane Switching Display Mode"; Asia Display '95; pp. 707–710.

S. Matsumoto et al.; Display Characteristics of In–Plane Switching (IPS) LCDs and a Wide–Viewing–Angle 14.5–in. OPS TFT–LCD; Euro Display '96; pp. 445–448.

H. Wakemoto et al.; "An Advanced In–Plane Switching Mode TFT–LCD"; SID 97 Digest; pp. 929–932.

S.H. Lee et al.; High–Transmittance, Wide–Viewing–Angle Nematic Liquid Crystal Display Controlled by Fringe–Field Switching; Asia Display '98; pp. 371–374.

* cited by examiner

ARRAY SUBSTRATE FOR IPS MODE LIQUID CRYSTAL DISPLAY DEVICE AND METHOD FOR FABRICATING THE SAME

This application claims the benefit of Korean Patent Application No. 2000-79356, filed on Dec. 20, 2000 in Korea, which is hereby incorporated by reference as if fully set forth herein.

BACKGROUND OF THE INVENTION

1. Field of the Invention

The present invention relates to a liquid crystal display (LCD) device, and more particularly to an array substrate and a fabricating method thereof for a liquid crystal display device that implements In-Plane Switching (IPS) in which an electric field applied to liquid crystal is generated in a plane parallel to a substrate.

2. Discussion of the Related Art

Until recently, a cathode-ray tube (CRT) has usually been used for displays. However, flat panel displays are becoming more common because of their small depth, low weight and low power consumption. Thin film transistor liquid crystal displays (TFT-LCDs) are currently undergoing development to improve their resolution and to reduce their thickness.

Generally, a liquid crystal display device includes an upper substrate and a lower substrate each having an electrode thereon and liquid crystal interposed therebetween. If the liquid crystal is aligned by an electric field generated by a voltage applied to the electrodes, desired images can be displayed by a change of transmissivity that depends on the alignment direction of the liquid crystal molecules.

The general structure of a conventional liquid crystal display device will be described hereinafter with reference to FIG. 1. FIG. 1 is a cross-sectional view illustrating a structure of the conventional liquid crystal display device. As shown in the figure, a gate electrode 21 made of conductive material such as a metal is formed on a lower substrate 10, i.e., an array substrate. A gate insulating layer 30 including inorganic insulating material such as silicon oxide ($SiO_2$) or silicon nitride ($SiN_x$) is formed on the gate electrode 21 and on the lower substrate 10. An active layer 41 is formed on the gate insulating layer 30 using amorphous silicon. An ohmic contact layer 51, 52 is formed on the active layer 41 using a doped amorphous silicon. Source and drain electrodes 61, 62 made of conductive material are formed on the ohmic contact layer 51, 52 respectively. The gate electrode, the source electrode and the drain electrode constitute a thin film transistor "T". A passivation layer 70 is then formed on the source and drain electrode 61, 62 using inorganic insulating material or organic insulating material. A contact hole 71 through the passivation layer 70 exposes the drain electrode 62 to the air. A pixel electrode 81 made of transparent conductive material is formed on the passivation layer 70. The pixel electrode 81 contacts the drain electrode 62 through the contact hole 71. A black matrix 91 is formed beneath a part of an upper substrate 90 corresponding to the thin film transistor "T". A color filter 92 is formed beneath the black matrix 91. The color filter 92 has sub-color filters Red (R), Green (G) and Blue (B) arranged in a repeated order of R, G, B. A common electrode 93 made of transparent conductive material is formed beneath the color filter 92. In addition, a liquid crystal layer 100 is interposed between the upper and lower substrates 90, 10.

Liquid crystal molecules are aligned by an electric field generated perpendicularly to the substrates by a voltage applied to the pixel and common electrodes in the conventional liquid crystal display device. Characteristics such as a transmissivity and an aperture ratio are good in the conventional liquid crystal display device and, because the common electrode serves as a ground, destruction of a liquid crystal cell caused by static electricity can be prevented. However, the conventional liquid crystal display device has disadvantages such as a narrow viewing angle. Accordingly, an in-plane switching (IPS) mode liquid crystal display device has been suggested as an alternative to overcome the disadvantages such as a narrow viewing angle.

SUMMARY OF THE INVENTION

Accordingly, the present invention is directed to an array substrate of in-plane switching (IPS) mode liquid crystal display device and a method for fabricating the same that substantially obviates one or more of problems due to limitations and disadvantages of the related art.

An advantage of the present invention is to provide an in-plane switching liquid crystal display device that can improve a viewing angle and a production yield.

Another advantage of the present invention is to provide a fabricating method for an in-plane switching liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching liquid crystal display device includes first and second substrates, a gate line and a data line defining a pixel region on the first substrate, a first line on the first substrate, a common line on the first line, a thin film transistor at a crossing portion between the gate and data lines, a plurality of pixel electrodes on the first substrate, a plurality of common electrodes on the first substrate, a first pixel electrode connecting line on the first substrate, and a liquid crystal layer between the first and second substrates. The first pixel electrode connecting line is partially overlapped with the common line. The in-plane switching liquid crystal display device further includes an auxiliary pattern extended from the first line. The auxiliary pattern is between the first line and the first pixel electrode connecting line. The auxiliary pattern is formed outermost of the common electrode. The in-plane switching liquid crystal display device further comprises a second line underneath the gate line. The thin film transistor includes gate, source and drain electrodes. The common electrode is at the same layer as the gate electrode. The pixel electrode is at the same layer as the source and drain electrodes.

In another aspect, an in-plane switching liquid crystal display device includes first and second substrates, a gate line and a data line defining a pixel region on the first substrate, a first line on the first substrate, a common line on the first line, a thin film transistor at a crossing portion between the gate and data lines, a plurality of pixel electrodes on the first substrate, a plurality of common electrodes on the first substrate, an auxiliary pattern extended from the first line, and a liquid crystal layer between the first and second substrates. The in-plane switching liquid crystal display device further comprises a first pixel electrode connecting line on the first substrate. The first pixel electrode connecting line is partially overlapped with the common line. The auxiliary pattern is between the first line and the first pixel electrode connecting line. The auxiliary pattern is formed outermost of the common electrode. The in-plane switching liquid crystal display device further includes a second line underneath the gate line. The thin film transistor includes gate, source and drain electrodes. The common electrode is at the same layer as the gate electrode. The pixel electrode is at the same layer as the source and drain electrodes.

In another aspect, a method for fabricating an in-plane switching liquid crystal display device comprises the steps of forming a gate line and a data line defining a pixel region on a first substrate, forming a first line on the first substrate, forming a common line on the first line, forming a thin film transistor at a crossing portion between the gate and data lines, forming a plurality of pixel electrodes on the first substrate, forming a plurality of common electrodes on the first substrate, forming a first pixel electrode connecting line on the first substrate and forming a liquid crystal layer between the first substrate and a second substrate facing the first substrate. The first pixel electrode connecting line is partially overlapped with the common line. The method for fabricating an in-plane switching liquid crystal display device further comprises the step of forming an auxiliary pattern extended from the first line. The auxiliary pattern is between the first line and the first pixel electrode connecting line. The auxiliary pattern is formed outermost of the common electrode. The method for fabricating an in-plane switching liquid crystal display device further includes the step of forming a second line underneath the gate line. The thin film transistor includes gate, source and drain electrodes. The common electrode is at the same layer as the gate electrode. The pixel electrode is at the same layer as the source and drain electrodes.

The viewing angle can be improved by introducing the in-plane switching (IPS) mode liquid crystal display device where the common electrode and the pixel electrode are formed on the same substrate and the liquid crystal is aligned by lateral electric field generated by a voltage applied to the common and pixel electrodes. The auxiliary patterns are formed between the first pixel electrode connecting line and the data line parallel to the data line. When the pixel electrode and the data line are formed simultaneously in a same process, there may be residues of conductive material such as a metal. Accordingly, the auxiliary pattern step prevents residues from connecting the pixel electrode to the data line and thus prevents a short circuit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 1:
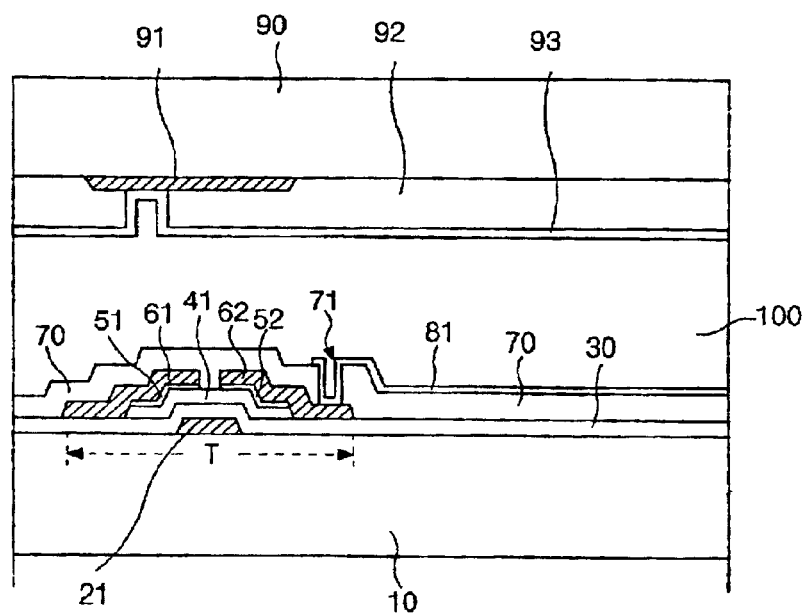
FIG. 1 is a cross-sectional view illustrating a structure of a conventional liquid crystal display device.
Figure 2:
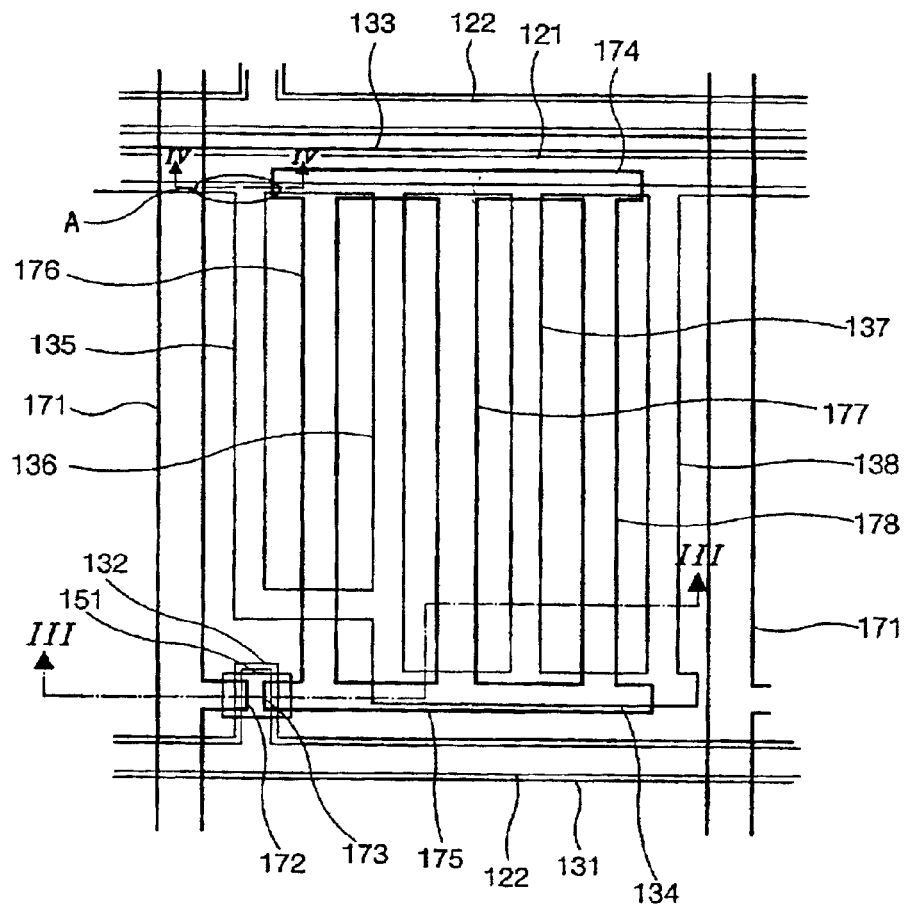
FIG. 2 is a plan view illustrating a pixel of an array substrate according to a first embodiment of the present invention.
Figure 3:
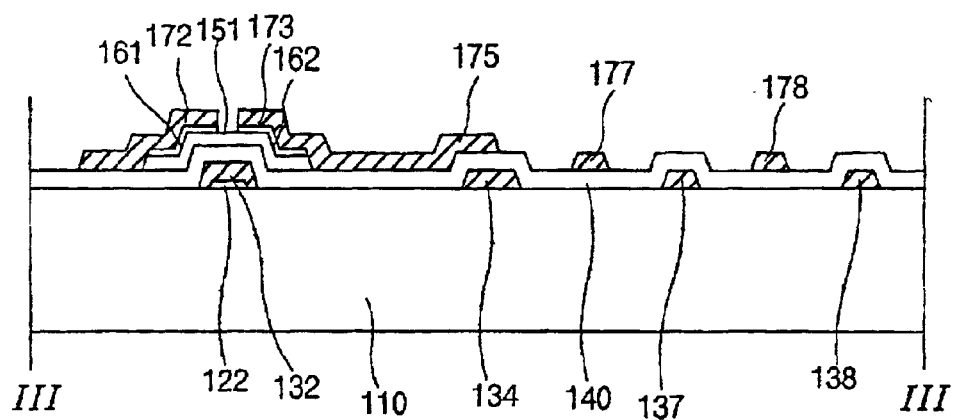
FIG. 3 is a cross-sectional view taken along III—III of FIG. 2.

FIG. 2 is a plan view illustrating a pixel of an array substrate according to a first embodiment of the present invention and FIG. 3 is a cross-sectional view taken along III—III of FIG. 2. As shown in the figures, first and second lines 121, 122 made of metallic material having a low electric resistance are formed horizontally on a transparent insulating substrate 110. The first and second lines 121, 122 are for reducing the electric resistance of a common line 133 and a gate line 131, respectively. The common line 133 and the gate line 131 are formed on the first line 121 and the second line 122, respectively. A gate electrode 132 extending from the gate line 131 is formed on the second line 122. First, second, third and fourth common electrodes 135, 136, 137, 138 are vertically arranged in the context of FIG. 2. Upper ends of the common electrodes are connected to the common line 133, and a common electrode connecting line 134 is connected to lower ends of the common electrodes 135, 136, 137, 138. A gate insulating layer 140 including inorganic insulating material such as silicon oxide ($SiO_2$) or silicon nitride ($SiN_x$), for example, is formed on the substrate 110. A semiconductor layer 151 including amorphous silicon is formed on a part of the gate insulating layer 140 corresponding to the gate electrode 132 and the semiconductor layer 151 serves as an active layer of a thin film transistor. Ohmic contact layers 161, 162 including doped amorphous silicon are formed on the semiconductor layer 151. The ohmic contact layers are for reducing an electric resistance caused by a contact between the semiconductor layer 151 and a source and drain electrodes 172, 173. A data line 171, the source electrode 172, the drain electrode 173, a first and second pixel electrode connecting lines 174, 175 and a first, second and third pixel electrodes are formed with conductive material such as a metal on the ohmic contact layer 161, 162. The data line 171 defines a pixel region by crossing the gate line 131. The source electrode 172 extends from the data line 171. The drain electrode 173 is spaced apart from the source electrode 172. The gate electrode and the source and drain electrode constitute the thin film transistor. The first, second and third pixel electrodes 176, 177 and 178 are vertically arranged in an alternating order with the corresponding common electrodes 135, 136, 137, 138. Upper and lower ends of the pixel electrodes are connected to the horizontal first and second pixel electrode connecting line 174, 175 respectively. The second pixel electrode connecting line 175 is connected to the drain electrode 173. A passivation layer may further be formed on the data line 171 and the pixel electrodes 176, 177, 178.

The present invention can improve a viewing angle by forming the pixel and common electrode on the same substrate, and thus driving liquid crystal molecules by applying a lateral electric field to the liquid crystal. The lateral electric field is generated when a voltage is applied to the pixel and common electrodes.

Figure 4A:
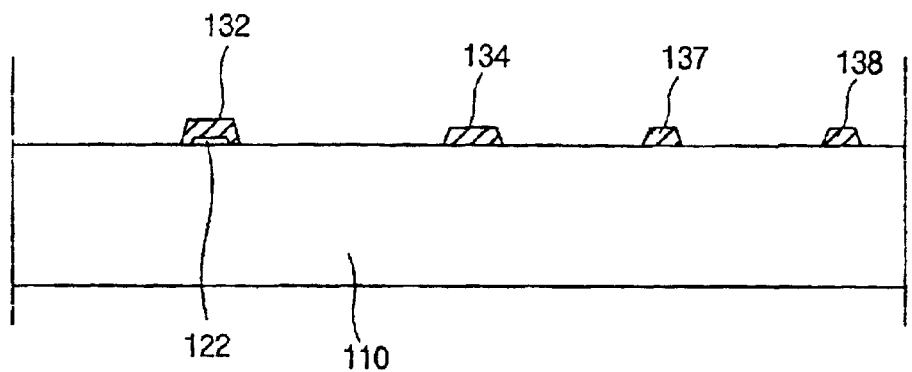
FIGS. 4A to 4C are cross-sectional views illustrating fabricating sequences of an array substrate according to the present invention.
Figure 4B:
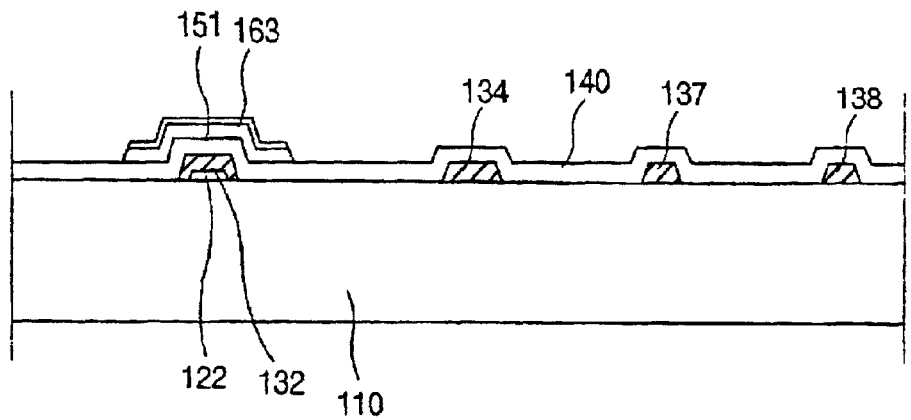
Figure 4C:
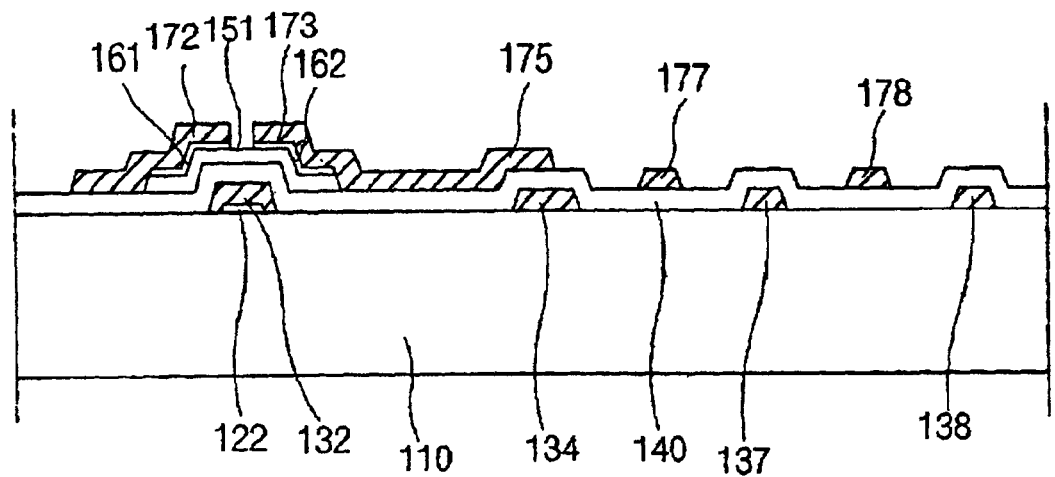

A fabricating method for an array substrate for in-plane switching (IPS) mode liquid crystal display device will be described more in detail hereafter with reference to FIG. 2 and FIGS. 4A to 4C. FIGS. 4A to 4C are cross-sectional views taken along III—III of FIG. 2 illustrating fabricating sequences of an array substrate according to the present invention.

Referring to FIG. 2 and FIG. 4A, horizontal first and second lines 121, 122 are formed on the transparent insulating substrate 110 by depositing and patterning conductive material such as a metal. The first and second lines 121, 122 are formed desirably with material having a good adhesive property and a low electric resistance. Then a gate line 131, a gate electrode 132, a common line 133, a common electrode connecting line 134, and first, second, third and fourth common electrodes 135, 136, 137, 138 are formed by depositing and patterning conductive material such as a metal. The common line 133 and the gate line 131 are formed on the first and second lines 121, 122, respectively.

Referring to FIG. 2 and FIG. 4B, a gate insulating layer 140 covering the gate electrode 132 is formed on the substrate 110. A semiconductor layer 151 and a doped semiconductor layer 163 are formed over the gate electrode 132 by depositing and patterning amorphous silicon and doped amorphous silicon respectively.

Referring to FIG. 2 and FIG. 4C, a data line 171, a source electrode 172, a drain electrode 173, first and second pixel electrode connecting lines 174, 175, and first, second and third pixel electrodes 176, 177, 178 are formed by depositing and patterning conductive metallic material such as molybdenum (Mo) or chromium (Cr), for example. The ohmic contact layers 161, 162 is subsequently formed by removing the doped semiconductor layer between the source electrode 172 and the drain electrode 173.

As described above, the first and second lines 121, 122 that are formed under the common line 133 and the gate line 131, respectively, to reduce the electric resistances prevent signals from being delayed. Because the pixel electrode and the common electrode are formed on the same substrate, and the pixel electrode and the data line are formed simultaneously in the same process, the fabricating process can be simplified according to the present invention. However, when the data line and the pixel electrodes are formed by etching the metallic material, a short circuit may occur because of residue of the metallic material between the data line 171 and the first pixel electrode connecting line 174.

Figure 5:
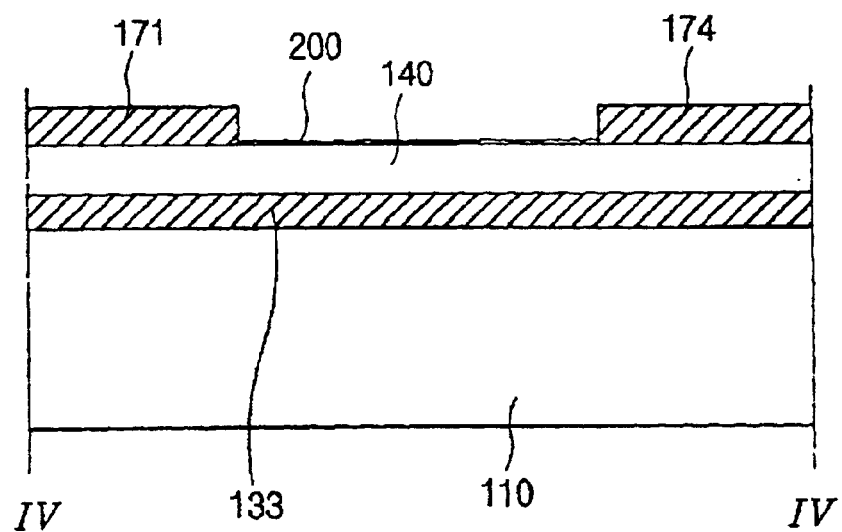
FIG. 5 is a cross-sectional view of a portion "A" of FIG. 2.

FIG. 5 is a cross-sectional view of a portion "A" of FIG. 2. As shown in the figure, a step is formed between the data line 171 and the first pixel electrode connecting line 174 by the first line 121. The common line 133 is formed on the substrate 110 and the gate insulating layer 140 is formed on the common line 133. The data line 171 and the first pixel electrode connecting line 174 are formed on the gate insulating layer 140. The data line 171 and the first pixel electrode connecting line 174 are formed simultaneously in the same process. After the metallic material between the data line 171 and the first pixel electrode connecting line 174 are etched away during the forming process for the data line 171 and the first pixel electrode connecting line 174, there may exist residues 200 due to a step generated by the first line 121. The residues 200 may electrically connect the data line 171 to the first pixel electrode connecting line 174 and thus cause a short.

Figure 6:
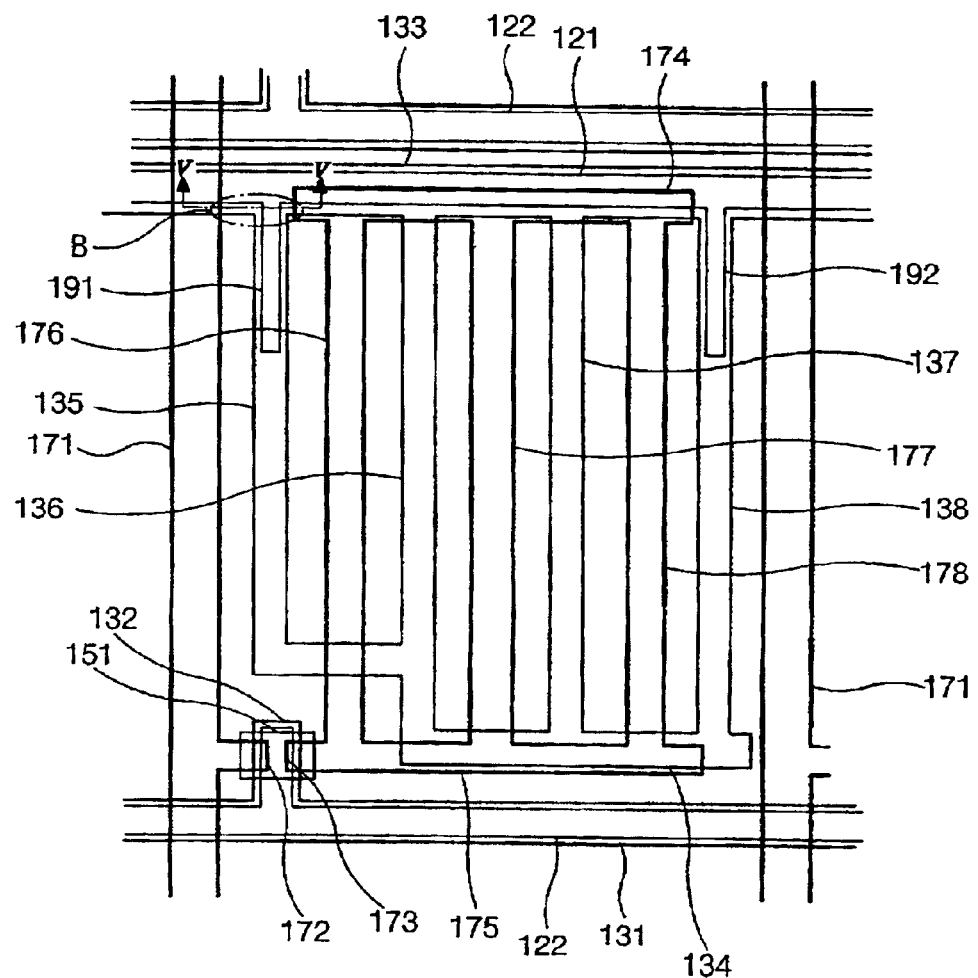
FIG. 6 is a plan view illustrating a pixel of an array substrate according to a second embodiment of the present invention.
Figure 7:
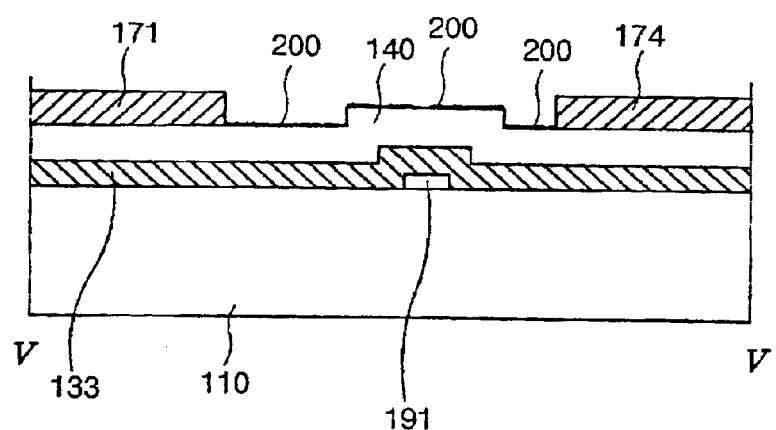
FIG. 7 is a cross-sectional view of a portion "B" of FIG. 6.

A second embodiment of the present invention to overcome the short problem will be described hereinafter with reference to FIG. 6 and FIG. 7. FIG. 6 is a plan view illustrating a pixel of an array substrate according to a second embodiment of the present invention and FIG. 7 is a cross-sectional view of a portion "B" of FIG. 6. The structure of the array substrate of the second embodiment is same as that of the first embodiment except portions of first and fourth common electrodes. As shown in FIG. 7, auxiliary patterns 191, 192 are vertically extended under the first and fourth common electrodes 135, 138 disposed between the data line 171 and the first pixel electrode connecting line 174. Accordingly as shown in FIG. 7, steps are formed perpendicularly to the steps generated by the first line between the data line 171 and the first pixel electrode connecting line 174. The steps generated by the auxiliary patterns 191, 192 prevent residues from connecting the data line 171 to the first pixel electrode connecting line 174 and thus prevent a short circuit.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. An in-plane switching liquid crystal display device comprising:

first and second substrates;

a gate line and a data line defining a pixel region on the first substrate;

a first conductive line formed directly on the first substrate;

a common line on the first conductive line;

a thin film transistor at a crossing portion between the gate and data lines;

a plurality of pixel electrodes on the first substrate;

a plurality of common electrodes on the first substrate;

a first pixel electrode connecting line on the first substrate;

an auxiliary pattern perpendicularly extended from the first conductive line; and a liquid crystal layer between the first and second substrates.

2. The device of claim 1, wherein the first pixel electrode connecting line is partially overlapped with the common line.

3. The device of claim 1, wherein the auxiliary pattern is between the data line and the first pixel electrode connecting line.

4. The device of claim 1, wherein the auxiliary pattern is formed outermost of the common electrodes.

5. The device of claim 1, further comprising a second conductive line underneath the gate line.

6. The device of claim 1, wherein the thin film transistor includes gate, source and drain electrodes.

7. The device of claim 6, wherein the common electrode is at the same layer as the gate electrode.

8. The device of claim 6, wherein the pixel electrode is at the same layer as the source and drain electrodes.

9. An in-plane switching liquid crystal display device comprising:

first and second substrates;

a gate line and a data line defining a pixel region on the first substrate;

a first conductive line formed directly on the first substrate;

a common line on the first conductive line;

a thin film transistor at a crossing portion between the gate and data lines;

a plurality of pixel electrodes on the first substrate;

a plurality of common electrodes on the first substrate;

an auxiliary pattern perpendicularly extended from the first conductive line; and a liquid crystal layer between the first and second substrates.

10. The device of claim 9, further comprising a first pixel electrode connecting line on the first substrate.

11. The device of claim 10, wherein the first pixel electrode connecting line is partially overlapped with the common line.

12. The device of claim 10, wherein the auxiliary pattern is between the data line and the first pixel electrode connecting line.

13. The device of claim 9, wherein the auxiliary pattern is formed outermost of the common electrodes.

14. The device of claim 9, further comprising a second conductive line underneath the gate line.

15. The device of claim 9, wherein the thin film transistor includes gate, source and drain electrodes.

16. The device of claim 15, wherein the common electrode is at the same layer as the gate electrode.

17. The device of claim 15, wherein the pixel electrode is at the same layer as the source and drain electrodes.

18. A method for fabricating an in-plane switching liquid crystal display device comprising:

forming a gate line and a data line defining a pixel region on a first substrate;

forming a first conductive line directly on the first substrate;

forming a common line on the first conductive line;

forming a thin film transistor at a crossing portion between the gate and data lines;

forming a plurality of pixel electrodes on the first substrate;

forming a plurality of common electrodes on the first substrate;

forming a first pixel electrode connecting line on the first substrate;

forming an auxiliary pattern perpendicularly extended from the first conductive line; and forming a liquid crystal layer between the first substrate and a second substrate facing the first substrate.

19. The method of claim 18, wherein the first pixel electrode connecting line is partially overlapped with the common line.

20. The method of claim 18, wherein the auxiliary pattern is between the data line and the first pixel electrode connecting line.

21. The method of claim 18, wherein the auxiliary pattern is formed outermost of the common electrodes.

22. The method of claim 18, further comprising forming a second conductive line underneath the gate line.

23. The method of claim 18, wherein the thin film transistor includes gate, source and drain electrodes.

24. The method of claim 23, wherein the common electrode is formed at the same layer as the gate electrode.

25. The method of claim 23, wherein the plurality of pixel electrodes are at the same layer as the source and drain electrodes.

* * * * *